Aug. 2, 1938.    R. H. MONEY    2,125,645
LUBRICATING ENCLOSED ENGINE
Filed June 11, 1936

INVENTOR.
ROLAND H. MONEY
BY Allen & Allen
ATTORNEYS.

Patented Aug. 2, 1938

2,125,645

UNITED STATES PATENT OFFICE 2,125,645

LUBRICATING ENCLOSED ENGINES

Roland H. Money, Cincinnati, Ohio, assignor to The Crosley Radio Corporation, Cincinnati, Ohio, a corporation of Ohio Application June 11, 1936, Serial No. 84,768

6 Claims. (Cl. 184—6)

I shall describe my invention in connection with an enclosed engine of the type which is used as a compressor for domestic mechanical refrigerators, since in this exemplary embodiment I can set forth the operation and the various features of my invention, it being understood, however, that the utility of my invention is not confined thereto.

The fundamental object of my invention is to provide by the rotation of the various operating parts of the engine a positive supply of lubricant to all surfaces where friction might develop.

This and the other objects of my invention which will be set forth hereinafter, are accomplished by that certain construction and arrangement of parts of which I shall now describe the aforesaid exemplary embodiment. Reference is made to the drawing wherein.

Figure 1:
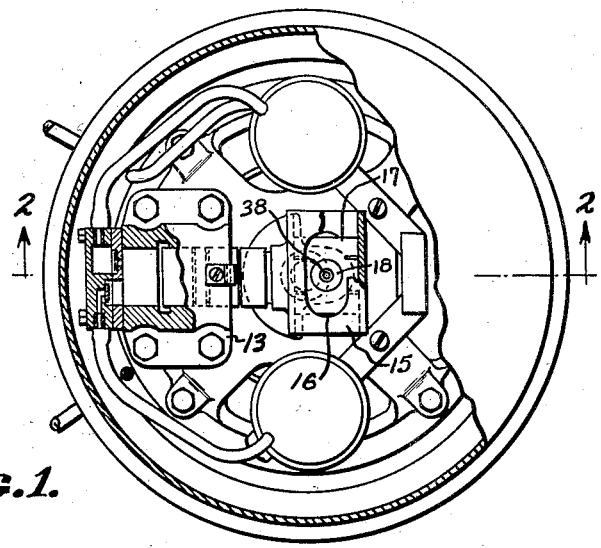
Fig. 1 is a plan view with certain parts in section of the compressor, the dome being cut away.
Figure 3:
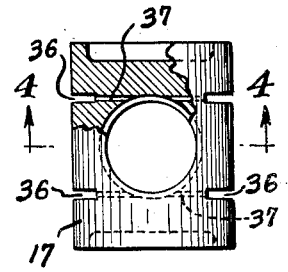
Fig. 3 is a plan view of a sliding member which is part of the mechanism whereby the rotary motion of the motor is converted into the reciprocating motion of the pump.
Figure 4:
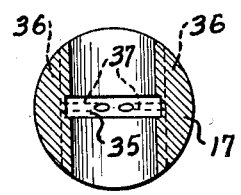
Fig. 4 is a sectional view thereof, taken along the lines 4—4 of Fig. 3.
Figure 5:
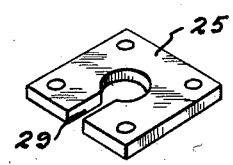
Fig. 5 shows a washer member.
Figure 2:
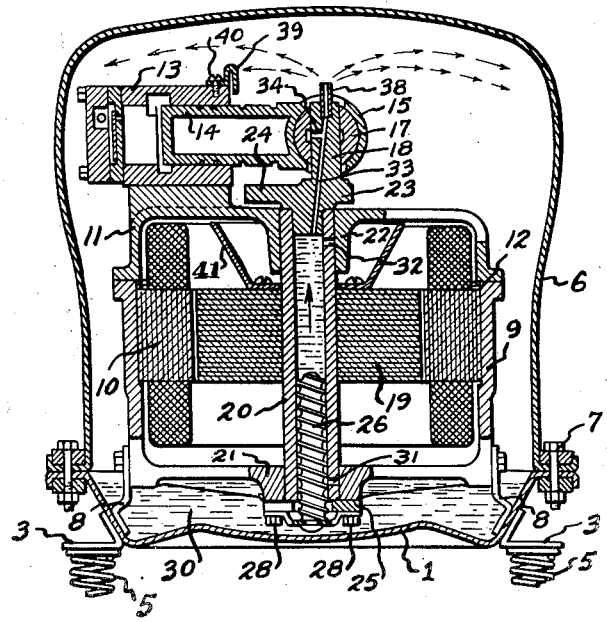
Fig. 2 is a vertical section taken along the lines 2—2 of Fig. 1.
Figure 6:
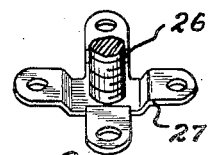
Fig. 6 shows in perspective a satisfactory mounting member for the screw.

In the construction of the exemplary embodiment of my invention, which is most clearly shown in Figs. 1 and 2, there is a base member, 1, peripherally mounted in the ring by means of brackets 3 which rest on compression spring 5. A dome, 6, is connected to the base in any suitable way, as by bolts, 7, so that the base and the dome together form a gas tight casing. Interior brackets 8 on the base serve to mount a motor housing, 9, to which is attached the stator, 10, of the motor. The motor housing has an upper portion 11, connected thereto as at 12, and serving to mount the cylinder, 13, of a reciprocating pump. The details of the pumping mechanism will not be described herein, since they form the subject matter of co-pending applications. The pump has a reciprocating piston, 14, to which is connected a sleeve member, 15, slotted as shown at 16. A cylindrical sliding member, 17, is placed within this sleeve and is engaged by a pin or crank, 18.

The armature or rotor, 19, of the pump is fastened to a hollow shaft, 20, journaled in a bearing member, 21, and thrusting against a washer or support, 25, fastened to the motor housing at the bottom and in a bearing member, 22, attached to the cover, 11, of the motor housing. A crank member, 23, is non-rotatably attached to the hollow shaft, 20. It may be counter-weighted as at 24 and bears the pin 18 referred to above.

The various other parts of the compressor such as the valves, the inlet and outlet mechanisms and the electrical connections may be any desired so far as this invention is concerned, and are not a limitation upon, nor do they form a part of the invention. They will, therefore, not be particularly described.

As the armature 19 revolves, the pin 18 is given a gyratory motion. As a part of this gyratory motion it rotates in the sliding member 17 which in turn slides in the sleeve 15. The revolution of the pin through this mechanism imparts a reciprocatory motion to the piston 14. It will be noted that there are relatively a large number of points where lubrication is required in a structure such as this. There is the bearing 21 and the bearing 22, both on the shaft 20. There is the bearing of the pin 18 in the sliding member 17. There is the slidable mounting of the member 17 in the sleeve 15, and there is the movement of the piston 14 in the cylinder 13.

I have found that I can make simple provision for positive feed of lubrication to all of these points, employing the rotative forces exerted by the moving parts. I do this in this invention by a modified form of Archimedes screw. In this instance the threaded member is the stationary member. I have shown such a screw at 26 fastened by riveting or otherwise to a spider 27 having arms as shown. This spider can be attached to the thrust washer 25 or, as shown, the thrust washer and spider arms may be slotted as at 29, to provide an additional passage for the ingress of oil.

The screw has a sliding fit inside the shaft 20 and the direction of the screw will, of course, be determined by the direction of rotation in the shaft 20, so that its effect will be to elevate oil and build up a pressure thereof inside the shaft 20. In the operation of a compressor of this type there is a body of oil in the lower part of the casing as indicated at 30. The pitch of the screw will be within the skill of the man in the art to determine in accordance with the pressure desired. The oil, of course, flows into the shaft 20 between the arms of the spider and through the slot 29. I have shown a passageway 31 whereby oil from the hollow interior of shaft 20 may get to the surfaces of the bearing 21. Likewise, I have shown a passageway 32, whereby oil from the hollow interior of the shaft may get to the surfaces of the upper bearing 22.

In the embodiment shown I drill a hole 33 through the crank member 23 and pin 18, and the oil under pressure in the shaft 20 is, of course, forced through this passageway. A transverse passageway 34 through the pin serves to conduct oil to the interior surfaces of the sliding member 17 and this member may be grooved as at 35 to form an oil ring. In order to lubricate the bearing of the member 17 in the sleeve 15, I have shown a construction which embodies the formation of parallel inwardly extending slots or grooves 36 in the member 17. These grooves may in turn be connected to the oil ring 35 by drilled holes 37 as shown, so that the pressure of oil in the ring 35 will cause oil to be forced through the passageway 37 into the slots or grooves 36.

At the top of the pin 18, I provide a pipe or tube 38 extending above the top of the sleeve 15. The pressure of oil in the hollow shaft 20 will tend to cause oil to be forced upwardly and through this tube, coming out at the free top thereof. It will be understood that the pin 18 has a rotary and gyratory motion, and this motion serves to spray the oil from the top of the tube 38 outwardly, as shown by the arrows. A portion of the oil will fall down in the slots 16 in the sleeve 15 to assist in the lubrication of the pin and of the sliding member 17. Other portions of the oil will fall down upon the outer surfaces of the piston 14 to lubricate it. In order to insure that this will happen, I provide a baffle 39 held by a screw 40, or other suitable means, to the cylinder 13, and so located in the path of the spraying oil as to catch and deflect some of it whereby it drips in sufficient volume onto the outer surfaces of cylinder 14. The cylinder 14 is, of course, provided with the usual oil grooves. The excess of oil sprayed from the tube 38 will either run down over other parts of the machinery or will collect against and run down the walls of the dome 6, thereby returning to the oil body 30. A cup 41 can be affixed to the armature so as to collect and throw outwardly any oil which might otherwise tend to run down between the armature and the field.

It will be understood that the embodiment which I have described is an exemplary embodiment, and that my invention is not limited thereto. Modifications may be made in my invention without departing from the spirit of it.

Having thus described my invention, what I claim as new and desire to secure by Letters Patent, is:

1. In a device of the character described, a vertical hollow shaft having bearing members for maintaining a reservoir of lubricant, a fixed screw located within said shaft, means for permitting ingress of lubricant to said shaft at one end of the screw therein, and passageways through said shaft for delivering lubricant from the hollow interior thereof to the bearing surfaces for said shaft bearings, a crank member on the end of said shaft opposite said screw, a passageway through said crank member and delivery means for lubricant therefrom, said crank member adapted to be given a gyratory movement whereby lubricant is sprayed in transverse directions from said lubricant delivery means.

2. In a device of the character described, a vertical hollow shaft having bearing members, means for maintaining a reservoir of lubricant, a fixed screw located within said shaft, means for permitting ingress of lubricant to said shaft at one end of the screw therein, and passageways through said shaft for delivering lubricant from the hollow interior thereof to the bearing surfaces for said shaft bearings, a crank member on the end of said shaft opposite said screw, a passageway through said crank member and delivery means for lubricant therefrom, said crank member adapted to be given a gyratory movement whereby lubricant is sprayed in transverse directions from said lubricant delivery means, and means in the path of said sprayed lubricant for diverting said lubricant and delivering it to moving parts of said apparatus.

3. In a device of the character described, a vertical hollow shaft having bearing members, means for maintaining a reservoir of lubricant, a fixed screw located within said shaft, means for permitting ingress of lubricant to said shaft at one end of the screw therein, and passageways through said shaft for delivering lubricant from the hollow interior thereof to the bearing surfaces for said shaft bearings, a crank member on the end of said shaft opposite said screw, a passageway through said crank member and delivery means for lubricant therefrom, said crank member adapted to be given a gyratory movement whereby lubricant is sprayed in transverse directions from said lubricant delivery means, and means in the path of said sprayed lubricant for diverting said lubricant and delivering it to moving parts of said apparatus, a relatively rotative member on said crank and a passage through said crank for delivering lubricant to the surfaces of said relatively rotative member.

4. In a device of the character described, a reciprocatory member, a sleeve attached thereto, a member slidably mounted in said sleeve, a crank rotatively mounted in said sliding member, a passageway in said crank and means for delivering lubricant therefrom to the interior of said sliding member, said sliding member having reservoir means where it contacts said sleeve, and at least one passageway from the interior surface of said sliding member to said reservoir means.

5. In a device of the character described, a vertical hollow shaft, means for maintaining lubricant under pressure in the hollow of said shaft, a crank member on the end of said shaft, a passageway through said crank member and delivery means for lubricant therefrom, said crank member adapted to be given a gyratory movement whereby lubricant is sprayed in transverse directions from said lubricant delivery means, and means in the path of said sprayed lubricant for diverting said lubricant and delivering it to moving parts of said apparatus.

6. In a device of the character described, a vertical hollow shaft, means for maintaining lubricant under pressure in the hollow of said shaft, a crank member on the end of said shaft, a passageway through said crank member and delivery means for lubricant therefrom, said crank member adapted to be given a gyratory movement whereby lubricant is sprayed in transverse directions from said lubricant delivery means, and means in the path of said sprayed lubricant for diverting said lubricant and delivering it to moving parts of said apparatus, a relatively rotative member on said crank and a passage through said crank for delivering lubricant to the surfaces of said relatively rotative member.

ROLAND H. MONEY.